United States Patent
Keyser et al.

(10) Patent No.: US 9,476,780 B2
(45) Date of Patent: Oct. 25, 2016

(54) CALORIMETERS FOR TESTING ENERGY STORAGE SYSTEMS AND POWER ELECTRONICS METHODS OF MAKING THE SAME AND METHODS OF USE

(75) Inventors: Matthew Allen Keyser, Arvada, CO (US); Ahmad Pesaran, Boulder, CO (US); Mark Alan Mihalic, Jamestown, CO (US); John Ireland, Denver, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 461 days.

(21) Appl. No.: 14/004,319

(22) PCT Filed: Mar. 9, 2012

(86) PCT No.: PCT/US2012/028580
§ 371 (c)(1),
(2), (4) Date: Sep. 10, 2013

(87) PCT Pub. No.: WO2012/125491
PCT Pub. Date: Sep. 20, 2012

(65) Prior Publication Data
US 2014/0003460 A1    Jan. 2, 2014

Related U.S. Application Data

(60) Provisional application No. 61/532,869, filed on Sep. 9, 2011, provisional application No. 61/451,884, filed on Mar. 11, 2011.

(51) Int. Cl.
*G01K 17/00* (2006.01)

(52) U.S. Cl.
CPC .................... *G01K 17/00* (2013.01)

(58) Field of Classification Search
CPC ..................................................... G01K 17/00
USPC ............................................. 374/31, 32, 38
See application file for complete search history.

(56) References Cited

U.S. PATENT DOCUMENTS

| | | | |
|---|---|---|---|
| 3,141,989 A | | 7/1964 | Jones et al. |
| 3,718,437 A | | 2/1973 | Paloniemi |
| 4,208,907 A | * | 6/1980 | Townsend ............. G01K 17/00 374/34 |
| 4,511,263 A | * | 4/1985 | Prosen .................. G01N 25/26 374/33 |
| 4,923,306 A | | 5/1990 | Fauske |
| 5,186,540 A | | 2/1993 | Walsh et al. |

(Continued)

FOREIGN PATENT DOCUMENTS

| | | |
|---|---|---|
| JP | 61-243349 | 10/1986 |
| JP | 2000-348835 | 12/2000 |
| JP | 2005-214372 | 8/2005 |

OTHER PUBLICATIONS

Pesaran et al., "A Unique Calorimeter-Cycler for Evaluating High-Power Battery Modules", The Thirteenth Annual Battery Conference on Applications and Advances, Long Beach, CA, Jan. 13-16, 1998, pp. 127-131.

(Continued)

*Primary Examiner* — Lisa Caputo
*Assistant Examiner* — Philip Cotey
(74) *Attorney, Agent, or Firm* — John C. Stolpa

(57) ABSTRACT

Large volume calorimeters (100) and small volume, or cell, calorimeters (700), as well as methods of making and using the same, are provided.

28 Claims, 11 Drawing Sheets

(56) References Cited

U.S. PATENT DOCUMENTS

| | | | |
|---|---|---|---|
| 5,779,362 | A | 7/1998 | Lightfoot |
| 6,380,728 | B1 | 4/2002 | Tareilus et al. |
| 7,481,575 | B2 | 1/2009 | Brushwyler et al. |
| 2002/0098592 | A1* | 7/2002 | Neilson ............... G01N 25/482 436/147 |
| 2004/0123735 | A1 | 7/2004 | Watanabe et al. |
| 2006/0141341 | A1 | 6/2006 | Nishino et al. |
| 2006/0251145 | A1* | 11/2006 | Brushwyler ........... G01K 17/00 374/31 |
| 2008/0143337 | A1 | 6/2008 | Fujikawa et al. |
| 2008/0247441 | A1 | 10/2008 | Salvetti et al. |
| 2009/0092170 | A1* | 4/2009 | Brushwyler ........... G01K 17/00 374/33 |
| 2009/0310646 | A1 | 12/2009 | Schenker |
| 2010/0046573 | A1 | 2/2010 | Schick et al. |
| 2010/0303125 | A1 | 12/2010 | Bonnard |
| 2010/0316087 | A1* | 12/2010 | Pinhack ................ G01N 25/26 374/33 |

OTHER PUBLICATIONS

Supplementary European Search Report for European Application No. 12758345.8, mailed Jan. 15, 2015, pp. 1-6.
Pesaran et al., "FY 2007 NREL Energy Storage R&D Progress Report", Annual Report, Nov. 2007, NREL/TP-540-42716, pp. 1-27.
Pesaran, "Energy Storage R&D: Thermal Management Studies and Modeling", 2009 U.S. DOE Hydrogen Program and Vehicle Technologies Program Annual Merit Review & Peer Evaluation Meeting, May 2009, Arlington, VA http://www.nrel.gov/vehiclesandfuels/energystorage/pdfs/45531.pdf, pp. 1-39, accessed Jun. 19, 2012.
International Search Report and Written Opinion for International Application No. PCT/US2012/028580, mailed Jul. 6, 2012, pp. 1-9.
International Preliminary Report on Patentability for International Application No. PCT/US2012/028580, issued Sep. 17, 2013, pp. 1-7.

* cited by examiner

CALORIMETERS FOR TESTING ENERGY STORAGE SYSTEMS AND POWER ELECTRONICS METHODS OF MAKING THE SAME AND METHODS OF USE

CROSS-REFERENCE TO RELATED APPLICATIONS

This application claims priority to U.S. Provisional Application No. 61/451,884, entitled "LARGE VOLUME BATTERY CALORIMETER" filed on Mar. 11, 2011, and to U.S. Provisional Application No. 61/532,869, entitled "CALORIMETERS FOR TESTING ENERGY STORAGE SYSTEMS AND POWER ELECTRONICS" filed on Sep. 9, 2011. The contents of each application are incorporated by reference in their entirety.

CONTRACTUAL ORIGIN

The United States Government has rights in this disclosure under Contract No. DE-AC36-08GO28308 between the United States Department of Energy and Alliance for Sustainable Energy, LLC, the Manager and Operator of the National Renewable Energy Laboratory.

BACKGROUND

Devices that consume electrical power are ubiquitous in today's society. Many of these devices rely on electrical power stored in batteries and other energy storage devices such as, for example, capacitors in order to operate, while others rely on a different type of electrical power, such as a wall outlet. For battery-powered devices, typically the batteries are charged when the device is not in use, and are at least partially discharged as the device is used, thereby consuming the electrical power from the battery. With the increasing importance of electronic devices, device manufacturers are striving to make devices and batteries that run more efficiently (e.g., devices that consume less power and batteries that last longer on a single charge and generate less waste heat) and have a longer useful lifetime. In order to improve the performance of electronic devices and batteries, it is useful to understand the operating characteristics, including the thermal operating characteristics, of the devices and the batteries in order to, for example, design thermal management systems and/or redesign the device or battery in order to improve performance.

Calorimeters have previously been used to measure thermal operating characteristics of small batteries (e.g., hearing aid batteries), with the thermal operating characteristics including, among other things, the heat generated when the batteries are charged and/or discharged. These calorimeters, however, are typically very small in size and therefore of limited usefulness for determining thermal operating characteristics of larger batteries or for measuring thermal operating characteristics of other types of electronic devices. Moreover, attempts at increasing the size of these relatively small calorimeters in order to test larger batteries and other kinds of electronic devices have had limited success.

Some of the batteries that are particularly difficult to test using conventional calorimeters are those batteries used in hybrid electric vehicles (HEVs), plug-in hybrid electric vehicles (PHEVs), all-electric vehicles (EVs) and other kinds of electric vehicles. These batteries are typically very large, very heavy, and have very large current ratings. As HEVs, PHEVs, EVs, and other types of electric vehicles gain an increasing share of the global market for vehicles, automakers are developing more advanced vehicles and batteries that can operate efficiently and that can endure large numbers of charge and discharge cycles. This shift is spurred by a number of converging forces, such as state requirements for zero-emission vehicles, higher corporate average fuel economy standards, greenhouse gas regulations, the threat of oil price spikes, new smart grid and vehicle-to-grid technologies, and advances in battery technologies. The next generation of electrified cars and light trucks will aim to travel farther on electric power alone, placing greater power demands on the vehicles' battery packs. To meet these demands, automakers are building larger battery packs with advanced battery technologies, and are cycling batteries between greater states of charge. However, batteries typically generate waste heat as they are charged and discharged. This heat must be directed away from the battery through thermal control and/or management in order to prevent adverse effects on the life of the battery that comes from exposure to elevated temperature. The thermal management of these battery packs is thus very important to the life-cycle cost of the battery pack and efficient operation of the vehicle.

More generally speaking, understanding and controlling the thermal operating characteristics of a wide variety of electronic devices and batteries can be important in estimating and/or improving the performance and expected life of the devices and batteries. For example, the performance (e.g., instantaneous current capacity, total charge available, etc.), charge cycling and/or calendar life of a battery can significantly decline if the battery is not properly cooled, or if it is cycled too frequently or too rapidly. In the context of electric vehicles, reduced performance from the battery can lead to reduced gas mileage, and may lead to premature failure of the battery. As another example, for lithium-ion battery packs, overheating can lead to a fire or explosion of the battery pack. As still another example, some batteries may experience phase transitions during operation. These phase transitions may cause expansion and/or contraction of the constituent elements of the battery and may lead to cracks or other damage to the battery, which will reduce its life—a calorimeter can identify the battery operating point at which these phase transitions occur and a control system can be designed to avoid these operating points and extend the life of the battery.

If the thermal operating characteristics, such as, for example, the amount of heat generated during high current discharge, of an electronic device or battery are known, however, a manufacturer may be able to design an appropriate thermal management system to help mitigate performance losses and other problems that may otherwise be caused by, for example, a device or a battery overheating. The manufacturer may also be able to design improvements to the electronic device and/or battery.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be illustrative, not limiting in scope. In various embodiments, one or more of the above-described problems have been reduced or eliminated, while other embodiments are directed to other improvements.

In various aspects, the present disclosure is based on calorimeters and methods for making and using the same. The calorimeters described herein can help manufacturers understand the thermal operating characteristics of an electronic device or a battery by measuring the heat generated when a battery is charged and discharged or when a device is operated, by measuring whether the heat is generated electrochemically and/or resistively, and so forth. Furthermore the calorimeters described herein can be operated at multiple different testing temperatures in order to measure the thermal operating characteristics of electronic devices and batteries at multiple different temperatures. Knowing the thermal operating characteristics of electronic devices and batteries can help manufacturers design and implement thermal management systems in order to provide increased performance, longer life, and overall improvements in the electronic device and/or battery. The thermal operating characteristics may also help manufacturers improve the design and construction of the electronic devices and/or batteries.

In various aspects, the present disclosure is based on the thermal isolation of a battery or electronic device placed inside of a test chamber of a calorimeter provided herein. The calorimeters provided by the present disclosure minimize, and in many instances eliminate, thermal interference from external sources such as, for example, the ambient environment surrounding the calorimeters.

In some aspects, the present disclosure provides a large volume calorimeter, comprising: a test chamber comprising an inner box nested inside of an outer box and a plurality of heat flux sensors in contact with the exterior sidewalls of the inner box; at least one thermally insulative device between the floor of the inner box and the floor of the outer box; at least one busbar in contact with an interior wall of the inner box; and a lid; wherein the test chamber is configured to be fully submerged in an isothermal bath during operation of the calorimeter.

In some embodiments, the volume of the inner box is from about 4 liters to about 100 liters.

In some embodiments, the volume of the inner box is 96 liters.

In some embodiments, the isothermal bath comprises: an isothermal bath container comprising a bath cavity that is larger than the test chamber, an isothermal fluid disposed in the cavity, and a lid.

In some embodiments, the volume of the bath cavity is from about 100 gallons to about 200 gallons.

In some embodiments, the volume of the bath cavity is about 160 gallons.

In some embodiments, the at least one thermally insulative device provides thermal isolation of the floor of the inner box from the floor of the outer box.

In some embodiments, the at least one thermally insulative device comprises a column, comprising a sheath encircling an alternating arrangement of ceramic balls and cylinders.

In some embodiments, the at least one busbar comprises a cable connected to the busbar, wherein the cable comprises a first end disposed in the interior of the inner box and a second end disposed outside of the calorimeter.

In some embodiments, the cable is routed through the isothermal bath prior to connecting to the busbar.

In some embodiments, the lid comprises a snorkel, a burst disk and at least one sealing mechanism.

In some embodiments, each exterior sidewall of the inner box is thermally coupled to a corresponding interior sidewall of the outer box through a pair of wedges.

In some embodiments, the wedges comprise a thermally conductive material and are triangular in cross section.

In some embodiments, the isothermal bath comprises at least one heating element and at least one cooling element configured to control the temperature of the isothermal fluid in the isothermal bath.

In some embodiments, the isothermal bath also comprises at least one mixing element, comprising a motor, a long thin shaft, and at least one impeller.

In some aspects, the present disclosure provides a calorimeter, comprising: a test chamber, comprising an outer box comprising a plurality of heat flux sensors in contact with the bottom of the outer box; a first thermally conductive plate, a second thermally conductive plate and a third thermally conductive plate individually in contact with the top of some of the heat flux sensors; at least one interior wall in contact with an interior wall of the outer box; at least one busbar in contact with the interior floor of the outer box; and a lid; wherein the test chamber is configured to be fully submerged in an isothermal bath during operation of the calorimeter.

In some embodiments, the first thermally conductive plate comprises a plurality of holes.

In some embodiments, the first thermally conductive plate is anodized.

In some embodiments, the isothermal bath comprises: a container, comprising an inner bath cavity that is larger than the test chamber, an isothermal fluid disposed in the cavity, an outer box, and a lid; wherein the container is nested inside of the outer box.

In some embodiments, insulation is present between the container and the outer box.

In some embodiments, the second thermally conductive plate and the third thermally conductive plate are individually thermally isolated from the first thermally conductive plate through at least one thermally insulative device.

In some embodiments, the at least one thermally insulative device comprises a ceramic ball.

In some embodiments, the at least one busbar comprises a cable connected to the busbar, wherein the cable comprises a first end disposed in the interior of the test chamber and a second end disposed outside of the calorimeter.

In some embodiments, the cable is routed through the isothermal bath prior to connecting to the busbar.

In some embodiments, the lid comprises a snorkel, a burst disk and at least one sealing mechanism.

In addition to the aspects and embodiments described above, further aspects and embodiments will become apparent by reference to the drawings and by study of the following descriptions.

BRIEF DESCRIPTION OF THE DRAWINGS

Those skilled in the art will understand that the drawings, described herein, are for illustration purposes only. The drawings are not intended to limit the scope of the present disclosure.

DETAILED DESCRIPTION

Figure 1:
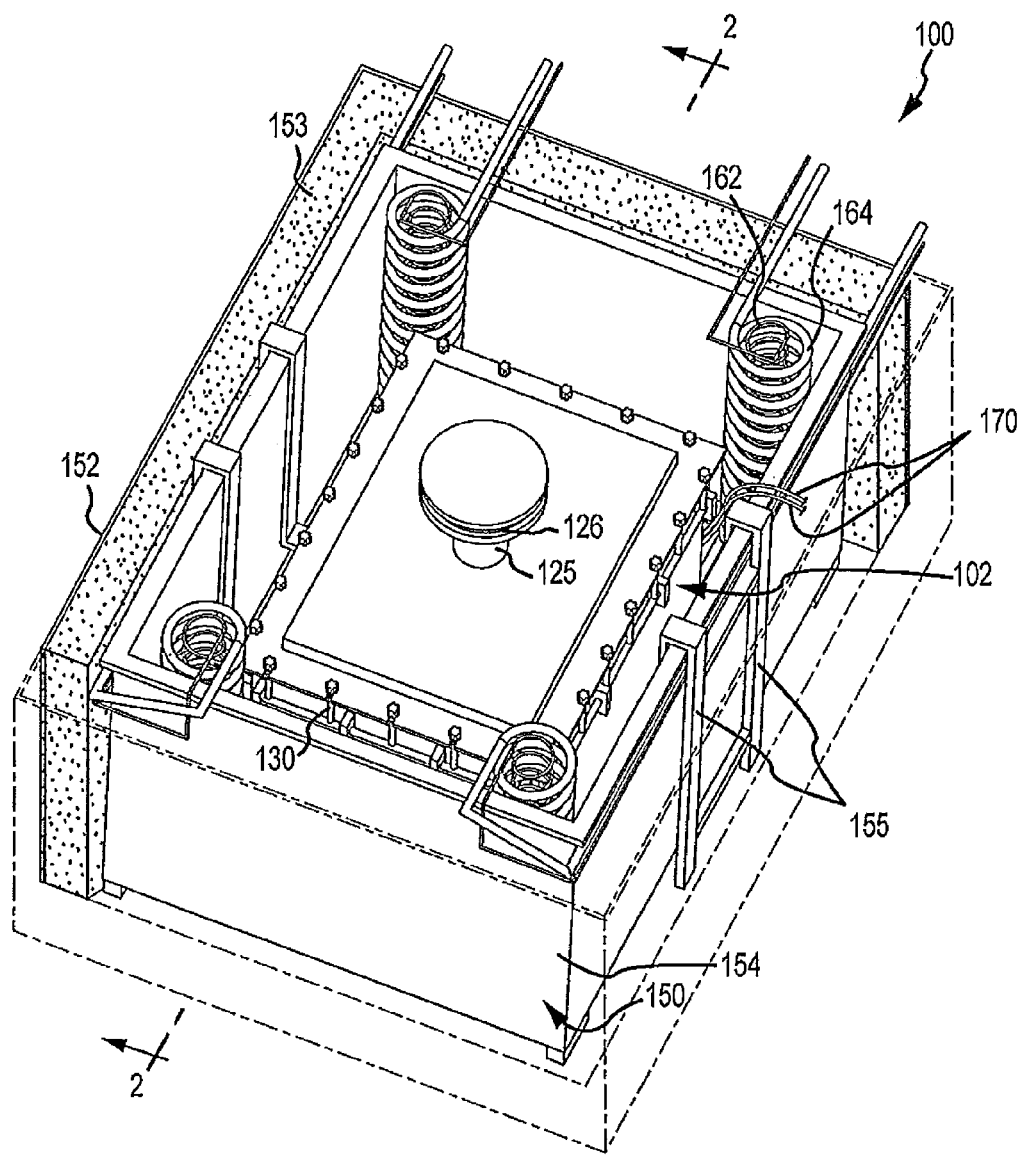
FIG. 1 shows a perspective view of one embodiment of a calorimeter provided by the present disclosure.

Reference is now made in detail to certain embodiments of calorimeters. The disclosed embodiments are not intended to be limiting of the claims. To the contrary, the claims are intended to cover all alternatives, modifications, and equivalents.

In various aspects, the present disclosure describes calorimeters and methods for making and using the same. The calorimeters described herein can help manufacturers understand the thermal operating characteristics of an electronic device or a battery by measuring the heat generated when a battery is charged and discharged or when a device is operated, by measuring whether the heat is generated electrochemically and/or resistively, and so forth. Furthermore the calorimeters described herein can operate across a wide range of testing temperatures and conditions and can thus measure the thermal operating characteristics of electronic devices and batteries at multiple different temperatures. Knowing the thermal operating characteristics of electronic devices and batteries can help manufacturers design and implement thermal management systems in order to provide increased performance, longer life, and overall improvements in the electronic device and/or battery. The thermal operating characteristics may also help manufacturers improve the design and construction of the electronic devices and/or batteries.

In various aspects, the present disclosure is based on the thermal isolation of a battery or electronic device placed inside of a test chamber of a calorimeter provided herein. In that regard, the test chambers of the calorimeters provided by the present disclosure provide testing environments that are thermally isolated from the external environment. When a battery and/or electronic device is placed inside of the test chamber, testing of the thermal operating conditions occurs with minimal, and in many cases without, thermal impact from the environment outside of the test chambers.

In various aspects, the calorimeters provided by the present disclosure are configured such that the heat generated by a battery or device placed inside of the test chambers is not lost or dissipated prior to measurement. The thermal pathways of the calorimeters are thus designed to direct the heat generated by a battery or electronic device directly to the heat flux gauges with minimal to no dissipation.

In various aspects, the calorimeters disclosed herein comprise a test chamber immersed in an isothermal bath. In certain embodiments, a test sample, such as, for example, an electronic device or a battery, is placed in the test chamber, which is then sealed and immersed in an isothermal fluid contained within the isothermal bath. One or more busbars may be coupled to the calorimeter and may help shunt heat from the connection terminals of the test sample to the calorimeter so that heat from the connection terminals is measured by the calorimeter. The power and/or the data cables that interface the interior of the test chamber with an external computer, or the like, and external power source, or the like, may be routed through the fluid of the isothermal bath to prevent ambient air temperature changes from being conducted through the cables into the interior of the test chamber. In certain embodiments, one or more thermally insulative device(s) may be used to prevent heat from flowing to certain parts of the calorimeter.

In various aspects, the size and structure of a calorimeter provided by the present disclosure can vary. The size of the calorimeters may depend on, among other things, the size and weight of a battery or other electronic device to be tested in the calorimeter. For example, a battery for a hybrid electric car may need a fairly large calorimeter due to its relatively large size, and the calorimeter will need to be able to support the relatively heavy weight of the battery. A smaller battery may not, however, need a large calorimeter and may benefit from having a smaller calorimeter (because, for example, manufacturing and/or operating a smaller calorimeter may be more cost efficient, a smaller calorimeter may provide more accurate thermal measurements, etc.). For the sake of discussion, this disclosure describes two different embodiments 100 (FIG. 1), 700 (FIG. 7) of calorimeters, one of which is a large volume calorimeter 100 and one of which is a small volume calorimeter 700. The concepts and principles described for both the large and small calorimeters 100, 700, however, are applicable to any size of calorimeter, and thus references to "large" and "small" in this disclosure are merely illustrative and not limiting.

Large Calorimeter

FIGS. 1 through 6 disclose embodiments of large volume calorimeters provided by the present disclosure. With reference to FIGS. 1 through 6, in some embodiments a calorimeter 100 may be of sufficient size to accommodate a relatively large and/or relatively heavy test sample 101, such as a battery pack 101 that may be used in an electric vehicle. The calorimeter 100 may be used, among other things, for precise measurements of the heat generated by the battery pack test sample 101 during charge and discharge cycles. Such measurements may assist in determining the expected life of the battery pack test sample 101 and in designing thermal management systems for the battery pack test sample 101.

The calorimeter 100 may additionally have other applications related to advanced vehicles. In some embodiments, the calorimeter 100 can be used to test power electronics for such vehicles, including power converters, inverters, and other such devices, and in some embodiments may be used to test supercapacitors, which are growing in importance as a way to reduce the electrical loads on battery packs. In some embodiments, the calorimeter 100 may also be used in determining the efficiency of the battery pack 101 and in helping to identify any deficiencies in its energy storage system. In some embodiments, the calorimeter 100 may be used to determine separately the heat generated from the battery and from the interconnects between battery cells. In various aspects, use of the calorimeter 100 for testing can address safety issues with the battery pack 101. Additionally, in certain embodiments, the calorimeter 100 may also be used for measuring the thermal operating characteristics of other types of batteries and other types of electronic devices including, for example, batteries for internal combustion engine vehicles (i.e., cars, trucks and the like), consumer electronic products (i.e., televisions, surge protectors, mobile telephones, and the like), and other objects and non-electrical devices that have self heat generation due to other physical or chemical attributes.

Test Chamber

With reference to FIGS. 2 through 5, the calorimeter 100 may include a test chamber 102. In some embodiments, the test chamber 102 has a "box within a box" configuration: an inner box 104 that holds the test sample 101 and that is enclosed with within an outer box 103.

In certain embodiments, the inner box 104 is placed inside of an outer box 103 that is slightly larger than the inner box 104. In various aspects, the test chamber 102 also comprises a removable lid 120 that can be sealed with one or more sealing mechanisms 130 after loading the test sample 101 inside. The sealing mechanism 130 may include o-rings, toggle clamps, plunger-type toggle clamps, spring loaded clamps, other sealing and fastening components, and combinations thereof. In some embodiments, the sealing mechanism 130 comprises clamps. The clamps may be spring loaded, and may maintain a seal between the lid 120 and the inner 104 and outer 103 boxes regardless of the temperature of the isothermal bath—the springs provide a consistent sealing force even and thus compensate for differential thermal expansion and contraction of the seals and unit. In the embodiment depicted in FIG. 1, the removable lid 120 seals both the inner 104 and outer 103 boxes of the test chamber 102 using a plurality of spring loaded clamps as the sealing mechanism 130.

Although the test chamber 102 shown in FIG. 1 comprises nested rectangular aluminum boxes 103, 104, the test chamber 102 may generally be any shape suitable for a particular test sample 101. The test chamber 102, including both the inner box 104 and the outer box 103, may be constructed from any metal or other material that is structurally rigid and thermally conductive.

Inner Box

The material from which the inner box 104 is created can vary. In certain embodiments, the inner box 104 is made of a thermally conductive material. In some embodiments, the thermally conductive material is selected from aluminum, iron, nickel, copper, zinc, tin, tungsten, lead, stainless steel, titanium, Hastalloy, Inconel, brass, and combinations thereof. In some embodiments, the inner box 104 is created from structurally rigid and thermally conductive materials selected from aluminum, copper, stainless steel, steel, titanium, Hastalloy, Inconel and combinations thereof. In some embodiments, the inner box 104 is aluminum.

The volume of the inner box 104 can vary. In some embodiments, the volume of the inner box can be from about 0.5 liters to about 200 liters. In some embodiments, the volume of the inner box 104 can be from about 4 to about 100 liters. In some embodiments, the volume of the inner box 104 is selected from about 0.5 liters, about 1 liter, about 1.5 liters, about 2 liters, about 2.5 liters, about 3 liters, about 3.5 liters, about 4 liters, about 5 liters, about 10 liters, about 15 liters, about 20 liters, about 25 liters, about 30 liters, about 35 liters, about 40 liters, about 45 liters, about 50 liters, about 55 liters, about 60 liters, about 65 liters, about 70 liters, about 75 liters, about 80 liters, about 85 liters, about 90 liters, about 95 liters, about 100 liters, about 110 liters, about 120 liters, about 130 liters, about 140 liters, about 150 liters, about 160 liters, about 170 liters, about 180 liters, about 190 liters and about 200 liters. In some embodiments, the volume of the inner box 104 is about 95 liters. In some embodiments, the volume of the inner box is 96 liters.

The shape of the inner box 104 can vary. In some embodiments, the shape of the inner box is selected from a square and a rectangle. In some embodiments, the inner box 104 is a rectangular aluminum box with a volume of about 96 liters. Calorimeters provided by the present disclosure comprising an inner box 104 of this volume are capable of testing test samples 101 with dimensions as large as 23.6 inches×15.7 inches×15.7 inches or less.

In various aspects, the inner box 104 comprises a plurality of heat flux sensors 110, such as heat flux gauges. In some embodiments, the heat flux sensors 110 are coupled to the side walls of the inner box 104. For example, in the embodiment depicted in FIG. 3, each of the four sidewalls of the inner box 104 comprises one or more heat flux sensors 110 coupled to the outside of the sidewalls. In some embodiments, the heat flux sensors 110 may be coupled to the inside of the sidewalls of the inner box 104. In certain embodiments, the heat flux sensors 110 are embedded within the walls of the inner box 104. In some embodiments, the heat flux sensors 110 are present in rows along the sidewalls of the inner box 104. In some embodiments, the heat flux sensors 110 are present in at least one row along the sidewalls of the inner box 104, in some embodiments in at least two rows, in some embodiments in at least three rows, in some embodiments in at least four rows and in some embodiments in rows to the top of the inner box 104. The heat flux sensors 110 may comprise, for example thermoelectric heat flux gauges, thermocouple-based heat flux gauges, and combinations thereof. In some embodiments, the heat flux sensors 110 are made of multiple dissimilar materials (such as ceramic, bismuth, telluride, solder, and so forth) that provide a low signal to heat flux ratio. The heat flux sensors 110 may be sensitive to differential thermal expansion of the materials used in the construction of the test chamber 102 and may be configured to allow heat to flow through them and into the outer box 103.

In some embodiments, the heat flux sensors 110 are coupled to the sidewalls, and not the bottom, of the inner box 104 to accommodate test samples 101 placed in the calorimeter 100 that are of large weight. For example, the test sample 101 may be a battery pack that weighs 200 kilograms or more, which may crack and damage the heat flux sensors 110 if the heat flux sensors 110 were coupled to the bottom of the inner box 104 and thus required to support the large weight of the test sample 101. Because the heat flux sensors 110 are coupled to the sidewalls of the inner box 104, in various aspects the inner box 104 is configured to encourage heat to flow from the bottom of the test chamber to the sidewalls comprising the heat flux sensors 110. In certain embodiments, this is accomplished by suspending the inner box 104 within the outer box 104 by one or more thermally insulative devices 108 and/or by insulation 123, as described in detail below.

The bottom of the inner box 104 may be made suitably thick to act as a heat conductor, and may be thermally coupled to the sidewalls of the inner box 104. In some embodiments, the thickness of the bottom and the thickness of the sidewalls of the inner box 104 are independently from about 0.5 inches to about 2 inches thick. In some embodiments, the thickness of the bottom and the thickness of the sidewalls of the inner box 104 are independently selected from 0.5 inches, 0.75 inches, 1.0 inch, 1.25 inches, 1.5 inches, 1.75 inches and 2 inches thick. In some embodiments, the thickness of the bottom and the thickness of the sidewalls is the same. In some embodiments, the thickness of the bottom and the thickness of the sidewalls is different. In some embodiments, the bottom and the sidewalls are both 1 inch thick. In this configuration, most or all of the heat from the battery will be passed to the bottom of the inner box 104, which will then flow to the sidewalls of the inner box 104 and into the heat flux sensors 110, which measure the amount of heat passed through them, and then to the outer box 103.

Outer Box

The material from which the outer box 103 is created can vary. In certain embodiments, the outer box 103 is made of a thermally conductive material. In some embodiments, the thermally conductive material is selected from aluminum, iron, nickel, copper, zinc, tin, tungsten, lead, stainless steel, titanium, Hastalloy, Inconel, brass, and combinations thereof. In some embodiments, the outer box 103 is created from structurally rigid and thermally conductive materials selected from aluminum, copper, stainless steel, steel, titanium, Hastalloy, Inconel and combinations thereof. In some embodiments, the outer box 103 is aluminum.

The thickness of the sidewalls and bottom of the outer box 103 can vary. In some embodiments, the thickness of the bottom and the thickness of the sidewalls of the outer box 103 are independently from about 0.5 inches to about 2 inches thick. In some embodiments, the thickness of the bottom and the thickness of the sidewalls of the outer box 103 are independently selected from 0.5 inches, 0.75 inches, 1.0 inch, 1.25 inches, 1.5 inches, 1.75 inches and 2 inches thick. In some embodiments, the thickness of the bottom and the thickness of the sidewalls is the same. In some embodiments, the thickness of the bottom and the thickness of the sidewalls is different. In some embodiments, the bottom and the sidewalls are both 0.75 inches thick.

In various aspects, the outer box 103 acts as a thermal buffer that prevents small changes in the isothermal bath (described below) from being detected by the heat flux sensors 110. The buffering provided by the outer box 103 allows the calorimeter 100 to have relatively low baseline fluctuations in the heat flux measured by the heat flux sensors 110, which is approximately +/−5.0 mW in some embodiments. The low baseline fluctuations in the measurements of the heat flux sensors 110 allow for increased sensitivity and increased accuracy in the measurements from the heat flux sensors 110.

Between the Inner Box and the Outer Box

Figure 2:
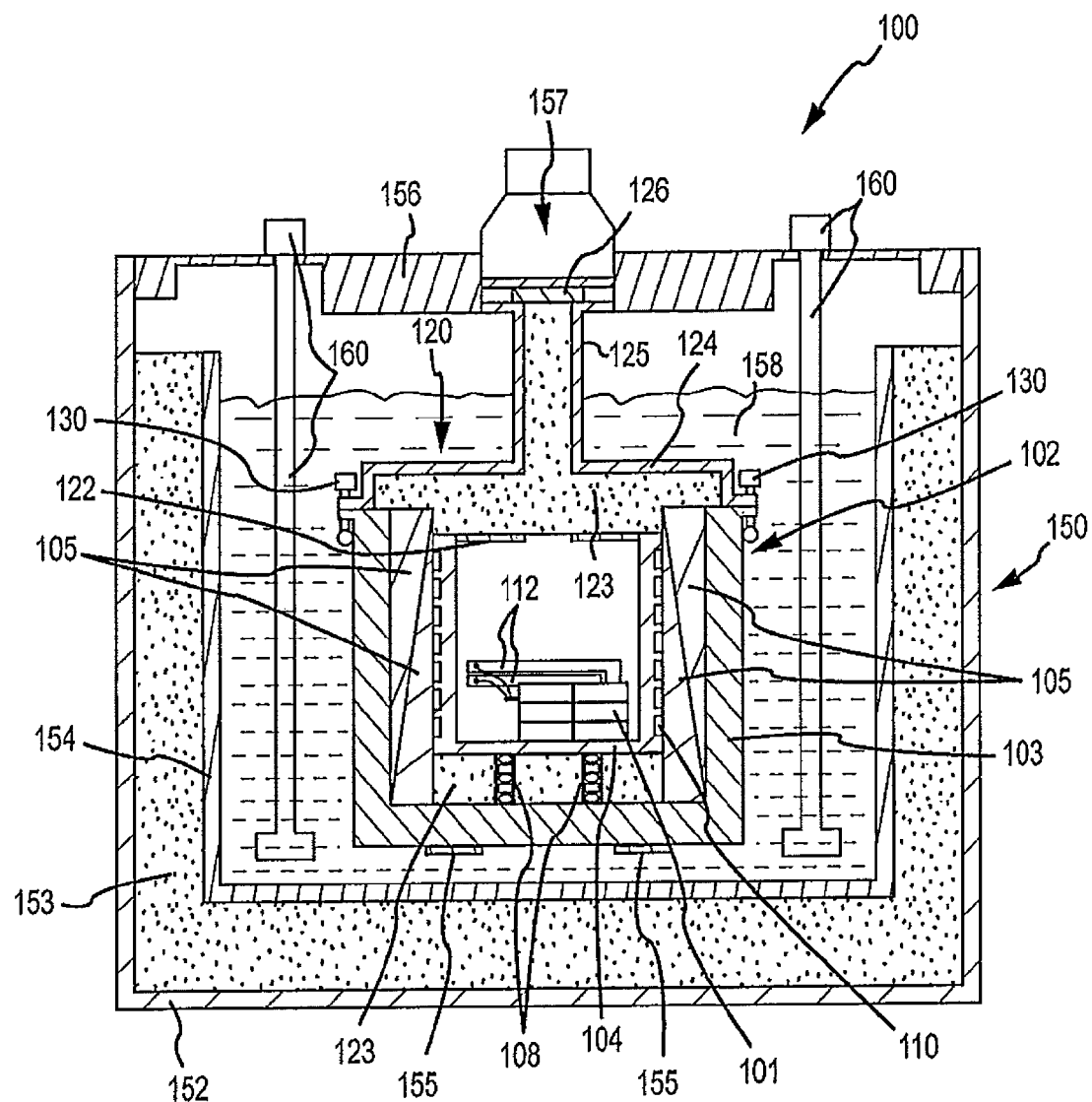
FIG. 2 shows a cross-section view of the calorimeter shown in FIG. 1, viewed along line 2-2 in FIG. 1.
Figure 3:
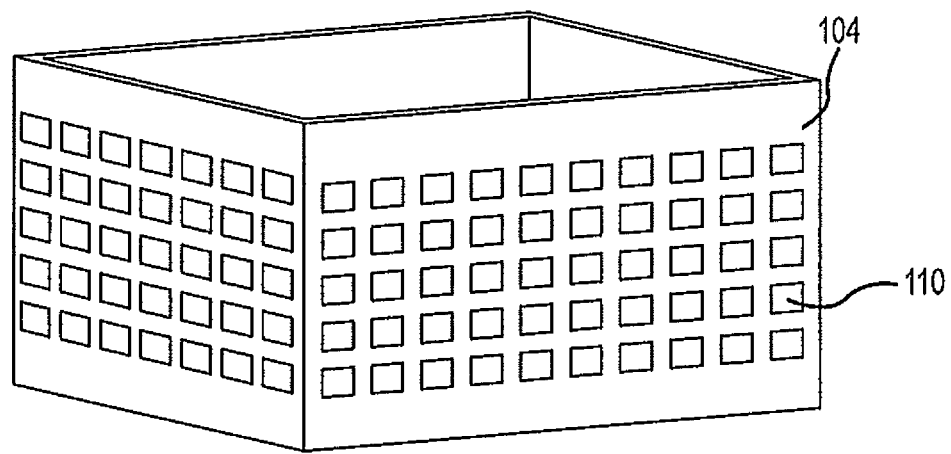
FIG. 3 shows a perspective view of an inner box of a test chamber for the calorimeter of FIG. 1.
Figure 6:
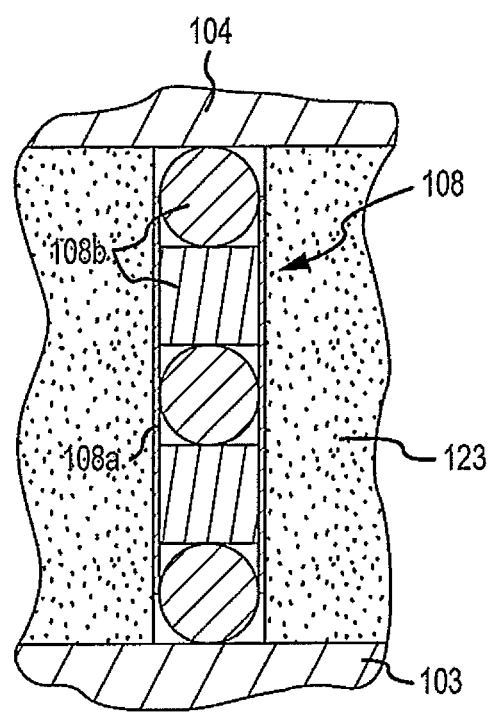
FIG. 6 shows an enlarged view of a portion of the cross-section view shown in FIG. 2.

With reference to FIGS. 2 and 6, the inner box 104 of the test chamber 102 may be suspended within the outer box 103 of the test chamber 102 by one or more thermally insulative devices 108. In various aspects, the thermally insulative devices 108 prevent heat from a test sample 101 placed within the inner box 104 to pass from the floor of the inner box 104 to the outer box 103. In this regard, heat is forced to move from the floor of the inner box 104 to the sidewalls of the inner box 104 and into the heat flux sensors 110. Therefore, in various aspects, the thermally insulative devices 108 are constructed from thermally insulative materials and are configured to minimize heat flow therethrough.

In some embodiments, the thermally insulative devices 108 comprise columns having sheaths 108a that hold an alternating arrangement of thermally insulating balls and cylinders 108b. The height of the thermally insulative devices 108 can vary. In some embodiments, the height of the thermally insulative devices 108 is from about 1 inch to about 6 inches tall. In some embodiments, the height of the thermally insulative devices 108 is selected from about 1 inch, about 1.5 inches, about 2 inches, about 2.5 inches, about 3 inches, about 3.5 inches, about 4 inches, about 4.5 inches, about 5 inches, about 6.5 inches and about 6 inches. In some embodiments, the height of the thermally insulative devices 108 is about 3 inches.

The material from which the sheaths 108a are generated can vary. In some embodiments, the sheaths 108a are created from structurally rigid and thermally conductive materials selected from aluminum, copper, stainless steel, steel, titanium, Hastalloy, Inconel and combinations thereof. In some embodiments, the sheaths 108a are aluminum. In various aspects, the sheaths may be of sufficient height to enclose the alternating arrangement of balls and cylinders 108b and also avoid contact with the floor of the inner box 104.

The material from which the balls and cylinders 108b are generated can vary. In some embodiments, the balls and cylinders 108b are generated from a thermally insulating material selected from inorganic, non-metallic, crystalline oxide, nitride or carbide materials. In some embodiments, the balls and cylinders 108b are ceramic.

The balls and cylinders 108b reduce conductive heat transfer between the inner box 104 and the outer box 103. In various aspects, the thermally insulative devices 108 are configured as shown in FIG. 6, such that the first point of contact between the floor of the inner box 104 is a ball, which allows only a small point of contact with the bottom of the inner box. The small point of contact will discourage heat from flowing from the floor of the inner box 104 to the outer box 103, thereby forcing the heat to flow to the sidewalls of the inner box 104 and into the heat flux sensors 110. In certain embodiments, the arrangement of the thermally insulative devices 108 is configured such that the last point of contact between the balls and cylinders 108b is also a ball placed into contact with the floor of the outer box 103. The point contacts within the ceramic ball-and-cylinder structure further limit conductive heat transfer. The thermally insulative devices 108 may include one or more ceramic balls and cylinders 108b, for example three ceramic balls and two ceramic cylinders are shown in the embodiment depicted in FIG. 6. Of course, other thermally insulative devices 108 (including balls and cylinders made from thermally insulative materials other than ceramic) may also or alternatively be used, or in some embodiments, no thermally insulative devices may be used.

With reference again to FIGS. 2 and 6, in some embodiments, the space created by the thermally insulative devices 108 between the bottoms of the inner 104 and outer 103 boxes of the test chamber 102 may be filled with insulation 123 to help reduce conductive heat transfer to the outer box 103 through the bottom of the inner box 104. The insulation 123 may be of any type that can prevent the transfer of heat from the inner box 104 to the outer box 103. In some embodiments, the insulation 123 is selected from multi-layer insulation, vacuum insulation, fiberglass insulation, ceramic insulation, aerogel, SEAgel, chalcogel, cadmium selenide insulation (e.g., quantum dots), and combinations thereof. In some embodiments, the insulation 123 is aerogel. The amount of insulation 123 used can be the same as, or different from, the height of the thermally insulative devices 108. In some embodiments, the amount of insulation 123 is selected to match the height of the thermally insulative devices 108. For example, in some embodiments, the thermally insulative devices 108 are three inches tall and the insulation 123 is three inches thick. In some embodiments, the selection of the insulation 123 can be made to provided added structural stability to the calorimeter 100. For example, in certain embodiments, the insulation 123 is aerogel, which provides structural strength to support the weight of the inner box 104. Aerogel has a thermal conductivity of about 0.008 W/m° K, and so three inches of aerogel measuring 23.6 in.×15.7 in. may only conduct 25 mW per ° C. of temperature difference. When combined with a bottom of the inner box 104 that is designed to conduct heat towards the sidewalls of the inner box 104, the temperature difference across the insulation 123 may be less than 0.1° C., which will help limit heat conduction through the insulation 123 to less than 2.5 mW.

In some embodiments, the sidewalls of the inner box 104 are thermally coupled to the sidewalls of the outer box 103 through one or more wedges 105. The wedges 105 comprise a thermally conductive material and are triangular in cross section, as shown for example in FIG. 2. The material from which the wedges 105 are created can vary. In certain embodiments, the wedges 105 are made of a thermally conductive material. In some embodiments, the thermally conductive material is selected from aluminum, iron, nickel, copper, zinc, tin, tungsten, lead, stainless steel, titanium, Hastalloy, Inconel, brass, and combinations thereof. In seine embodiments, the wedges 105 are created from structurally rigid and thermally conductive materials selected from aluminum, copper, stainless steel, steel, titanium, Hastalloy, Inconel and combinations thereof. In some embodiments, the wedges 105 are aluminum.

In some embodiments, the wedges 105 may be cut and positioned so that they act as if a single plate were sliced diagonally across its length, forming two wedge-shaped pieces that slide together to form a rectangular plate, as shown in FIG. 2. In the embodiment depicted in FIG. 2, one wedge 105 tapers from a thicker top to a thinner bottom (e.g., from one inch thick to one-quarter inch thick), while the matching wedge 105 tapers from a thinner top to a thicker bottom (e.g., from one-quarter inch thick to one inch thick). In some embodiments, the interface between the two wedges 105 may be coated with thermal grease, as may be the interface between the exterior wedge 105 and the sidewall of the outer box 103. In some embodiments, the grease can be substituted with a flexible and thermally conductive pad such as a sil-pad. In some embodiments, the wedges 105 may be replaced with a rectangular plate of unitary construction.

The wedges 105 may help apply a uniform pressure on the heat sensors 110 coupled to the sidewalls of the inner box 104 and provide a thermally conductive pathway for heat to flow from the inner box 104, through the heat sensors 100, and to the outer box 103. In some embodiments, the uniform pressure on the heat flux sensors 110 allows relatively inflexible ceramic heat flux sensors 110 to mount flush to the sides of the inner box 104 without fear of cracking the heat flux sensors 110. A tight flatness tolerance of the sides of the inner box 104 may ensure that the heat flux sensors 110 mount flush to the sides, thereby preventing any gaps from interfering with the conduction of heat through the heat flux sensors 110. In some embodiments, the wedges 105 may be replaced with a rectangular plate of unitary construction that provides similar thermal conductivity and uniform pressure as the wedges 105.

Busbars

Figure 4:
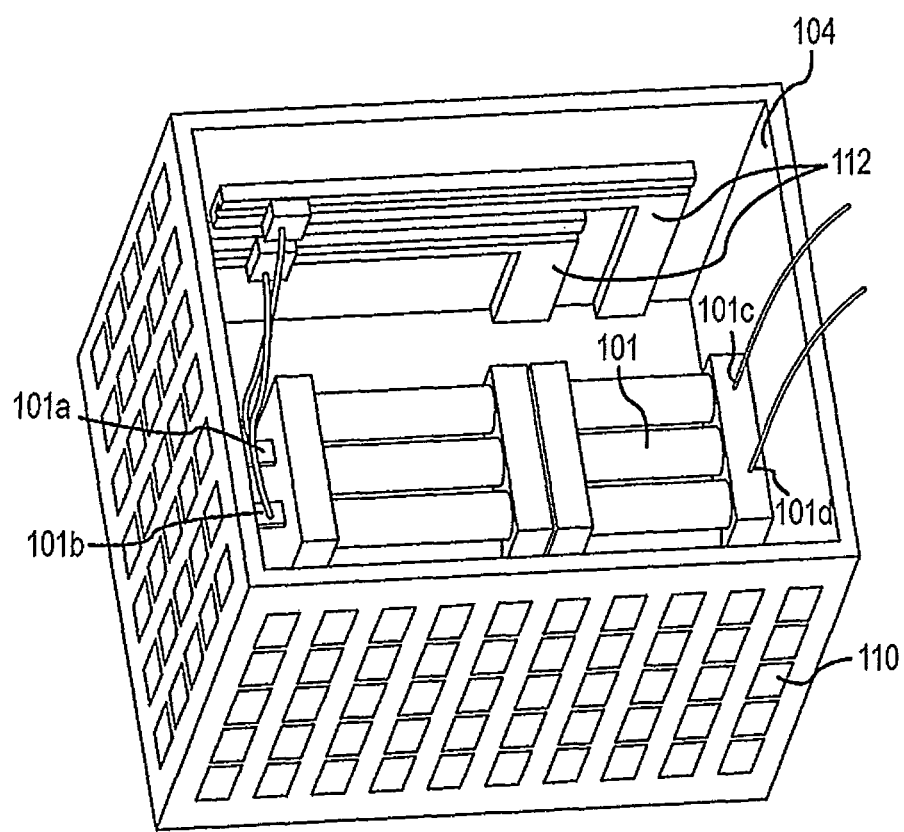
FIG. 4 shows a perspective view of the inner box shown in FIG. 3 with a battery inside.
Figure 5:
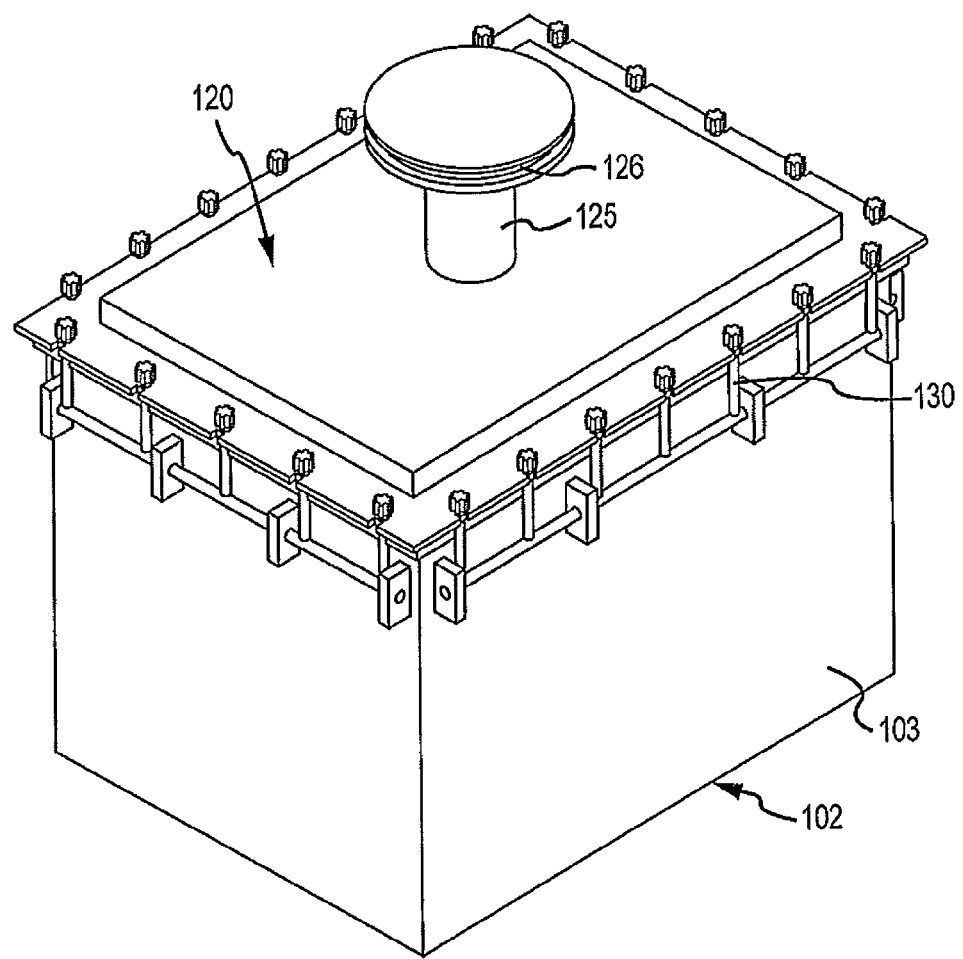
FIG. 5 shows an outer box and lid for a test chamber for use in the calorimeter shown in FIG. 1.

With reference to FIGS. 2 and 4, in some embodiments, one or more electrical conductors 112 may be mounted to the interior sidewalls of the inner box 104. In some embodiments, the electrical conductors 112 are busbars. In some embodiments, the electrical conductors 112 are mounted to the interior sidewalls of the inner box 104 through thermally conductive but electrically insulative pads such as, for example, 0.13 mm thick sil-pads.

The material from which the electrical conductors 112 are created can vary. In certain embodiments, the electrical conductors 112 are made of a thermally conductive material. In some embodiments, the thermally conductive material is selected from aluminum, iron, nickel, copper, zinc, tin, tungsten, lead, stainless steel, titanium, Hastalloy, Inconel, brass, and combinations thereof. In some embodiments, the electrical conductors 112 are created from structurally rigid and thermally conductive materials selected from aluminum, copper, stainless steel, steel, titanium, Hastalloy, Inconel and combinations thereof. In some embodiments, the electrical conductors 112 are copper.

The size of the electrical conductors 112 can vary. In some embodiments, the electrical conductors 112 span nearly the width of a sidewall of the inner box 104. In some embodiments, the width of the electrical conductors 112 can be from about 1 cm to about 10 cm. In some embodiments, the width of the electrical conductors 112 is selected from about 1 cm, about 2 cm, about 3 cm, about 4 cm, about 5 cm, about 6 cm, about 7 cm, about 8 cm, about 9 cm and about 10 cm. In some embodiments, the thickness of the electrical conductors 112 can be from about 0.5 cm to about 5 cm. In some embodiments, the width of the electrical conductors 112 is selected from about 0.5 cm, about 1 cm, about 1.5 cm, about 2 cm, about 2.5 cm, about 3 cm, about 3.5 cm, about 4 cm, about 4.5 cm and about 5 cm. In some embodiments, the electrical conductors 112 are about 5 cm wide and about 2.5 cm thick.

The electrical conductors 112 provide a coupling between a test sample 101 and an external power supply. In some embodiments, the power supply is configured to charge and discharge the test sample 101. For example, in the embodiment depicted in FIG. 4, the positive terminal 101a of a battery test sample 101 may be coupled to an external commercial battery cycler through a first busbar 112 and the negative terminal 101b of the battery test sample 101 may be coupled to the commercial battery cycler through a second busbar 112. As described below in more detail, the power cables between the busbars 112 and the external power supply may be routed through the isothermal bath fluid 158 to minimize their thermal impact on the test chamber 102.

The electrical conductors 112 help the calorimeter 100 capture and measure (via the heat flux sensors 110) the heat that comes from a test sample 101, for example, the positive and negative terminals 101a, 101b of a battery test sample 101, that would otherwise be lost through the lid if the power cables were routed to the external power supply directly through the lid 120 of the calorimeter to ambient air or to the isothermal fluid 158. This is because, without the electrical conductors 112, the power cables provide a thermal escape path out of the lid 120 that bypasses the calorimeter's 100 heat flux sensors 110. The electrical conductors 112 help the calorimeter 100 capture and measure the heat because they are thermally coupled to the inner box 104 and therefore shunt or sink heat to the inner box 104, which in turn shunts or sinks the heat to the outer box 103 through the heat flux sensors 110 and the wedges 105. The electrical conductors 112 help direct the heat flow of the power cables for the test sample 101 into the sidewalls of the inner box 103 and through the heat flux sensors 110, where it can be measured.

The electrically insulative pad prevents the current to and from the test sample 101 from flowing to the inner box 104.

The electrical conductors 112 provide the ability for the calorimeter 100 to accommodate and measure the heat generation from test samples 101 such as batteries with a large current rating, electric motors, electric generators, power electronics such as invertors and converters, and so forth, even with the relatively large amount of current involved.

Lid

In some embodiments, the lid 120 of the calorimeter 100 comprises an upper portion 124, and a lower portion 122, as shown in the embodiment depicted in FIG. 2. In some embodiments, a space exists between the upper portion 124 and the lower portion 122 that may be at least partially filled with insulation 123.

The material from which the upper portion 124 of the lid 120 is created can vary. In certain embodiments, the upper portion 124 of the lid 120 is made of a thermally conductive material. In some embodiments, the thermally conductive material is selected from aluminum, iron, nickel, copper, zinc, tin, tungsten, lead, stainless steel, titanium, Hastalloy, Inconel, brass, and combinations thereof. In some embodiments, the upper portion 124 of the lid 120 is created from structurally rigid and thermally conductive materials selected from aluminum, copper, stainless steel, steel, titanium, Hastalloy, Inconel and combinations thereof. In some embodiments, the upper portion 124 of the lid 120 is aluminum. In some embodiments, the lower portion 122 of the lid 120 is a plastic case. The insulation 123 may be of any type that can prevent the transfer of heat out of the lid 120. In some embodiments, the insulation 123 is selected from multi-layer insulation, vacuum insulation, fiberglass insulation, ceramic insulation, aerogel, SEAgel, chalcogel, cadmium selenide insulation (e.g., quantum dots), and combinations thereof. In some embodiments, the insulation 123 is aerogel. The amount of insulation 123 selected can completely fill the space between the upper portion 124 and the lower portion 122 of the lid 120, or it may partially fill the space between the upper portion 124 and the lower portion 122 of the lid 120.

In various aspects, the lid 120 comprises a snorkel 125 that provides emergency pressure relief in the event of thermal runaway of a test sample 101. In some embodiments, the snorkel 125 comprises a small pipe that extends upward from the center of the lid 120, and may be fitted with a burst disk 126. The snorkel 125 passes from the top of the test chamber 102, through the isothermal bath, and out of the top of the calorimeter 100, where a burst disk 126 caps the snorkel 125 pipe. The burst disk 126 may rupture when there is a differential pressure (e.g., 5 psi or more) from the inside to the outside of the test chamber 102, thereby helping protect the test chamber 102 from being damaged by over-pressure caused, for example, by a battery explosion. In addition, the burst disc 126 is placed above the isothermal bath liquid level, to prevent liquid from entering the calorimeter 100 in case the case of the burst disc 126 rupturing.

To block a potential heat path that could bypass the heat flux sensors 110, in some embodiments the snorkel 125 is insulated by placing insulation 123 within the snorkel 125 pipe. In some embodiments, the insulation 123 blocks heat flow but is still light enough so that it is ejected from the snorkel 125 pipe in the event of an over-pressurization of the test chamber 102. Because the snorkel 125 pipe passes through the isothermal fluid 158, its temperature may be essentially the same as the temperature of the outer box 103 of the test chamber, thereby helping to limit heat conduction. The insulation 123 may be of any type that can prevent the transfer of heat. In some embodiments, the insulation 123 is selected from multi-layer insulation, vacuum insulation, fiberglass insulation, ceramic insulation, aerogel, SEAgel, chalcogel, cadmium selenide insulation (e.g., quantum dots), and combinations thereof. In some embodiments, the insulation 123 is aerogel.

Isothermal Bath

In various aspects, the test chamber 102 is thermally isolated so that ambient temperatures do not influence the measurements taken by the heat flux sensors 110. Any suitable means of thermally isolating the test chamber 102 may be used. In some embodiments, the test chamber 102 is thermally isolated by immersion in an isothermal bath container 150 with isothermal fluid 158. With reference to FIGS. 1 and 2, in some embodiments an isothermal bath container 150 comprises an inner box bath cavity 154 that is larger than the test chamber 102 so that the test chamber 102 may be completely submerged in isothermal fluid 158 when placed in the inner box bath cavity 154.

The volume of the bath cavity 154 of the container 150 can vary. In some embodiments, the volume of the bath cavity 154 is from about 100 gallons to about 200 gallons. In some embodiments, the volume of the bath cavity 154 is selected from about 100 gallons, about 110 gallons, about 120 gallons, about 130 gallons, about 140 gallons, about 150 gallons, about 160 gallons, about 170 gallons, about 180 gallons, about 190 gallons and about 200 gallons. In some embodiments, the bath cavity 154 has a volume of about 160 gallons.

The material from which the inner box bath cavity 154 is created can vary. In certain embodiments, the inner box bath cavity 154 is made of a sturdy, structurally sound material capable of holding large volumes of liquid. In some embodiments, the material is selected from aluminum, iron, lead, stainless steel, brass, and combinations thereof. In some embodiments, the inner box bath cavity 154 is stainless steel.

In some embodiments, the test chamber 102 is supported within the inner box bath cavity 154 through one or more support structures 155, as shown in the embodiment depicted in FIGS. 1 and 2. With reference to FIG. 2, in some embodiments, a lid 156 is provided to the isothermal bath container 150, which may be insulated in some embodiments. In some embodiments, the lid 156 comprises a cavity and at least one inlet and at least one out port that are configured to allow the isothermal fluid 158 to be circulated through the cavity via a pump to reduce the impact of environmental conditions. The lid 156 may include a hood or vent 157 positioned over the snorkel 125 and burst disk 126 of the test chamber 102.

The temperature of the isothermal fluid 158 can vary. In some embodiments, the temperature of the isothermal fluid 158 may be controlled to ±0.001° C. within a range of −40° C. to 100° C. The temperature of the isothermal fluid 158 may be controlled by heating and cooling elements 162, 164 in sonic embodiments and by a plurality of mixing elements 160, as described in more detail below.

In some embodiments, the inner box bath cavity 154 is surrounded by insulation 153, which is in turn encased in an outer box 152. The insulation 153 may help maintain the isothermal bath at a relatively constant temperature despite a different ambient temperature. The insulation 153 may be of any type that can prevent the transfer of heat. In some embodiments, the insulation 153 is selected from multi-layer insulation, vacuum insulation, fiberglass insulation, ceramic insulation, aerogel, SEAgel, chaleogel, cadmium selenide insulation (e.g., quantum dots), and combinations thereof.

Isothermal bath fluid 158 may be used to fill the inner box bath cavity 154. In some embodiments, the isothermal bath fluid 158 is selected from Dynalene®, mineral oil, silicone oil, ethylene glycol/water, propylene glycol/water, Halocarbon, and combinations thereof. In certain embodiments, Dynalene® may be used in relatively large calorimeters, such as the calorimeter 100 embodiment illustrated in FIG. 1, due to its low viscosity at low temperatures, which may prevent thermal pockets from developing in the isothermal fluid 158. In some embodiments, the inner box bath cavity 154 is filled with air rather than a fluid such that the air serves as the thermal buffer between the test chamber 102 and the external environment. In some embodiments, the inner box bath cavity 154 is filled with a gas rather than a fluid such that the gas serves as the thermal buffer between the test chamber 102 and the external environment. In some embodiments, the gas comprises an inert gas that is unlikely to react with the components of the calorimeter 100. In some embodiments, the gas is selected from hydrogen gas, helium gas, nitrogen gas, oxygen gas, neon gas, argon gas, krypton gas, xenon gas and radon gas. In some embodiments, the gas is nitrogen gas.

The isothermal bath container 150 helps thermally isolate the test chamber 102 because the test chamber 150 is fully immersed in isothermal fluid 158 (i.e., rather than only five sides of the test chamber 102 being submerged in the bath). The added thermal isolation provided by immersing all six sides of the test chamber 102 helps prevent ambient temperatures in the room where the calorimeter 100 is used from influencing the measurements of the calorimeter 100 through the lid 120 of the test chamber.

Heating and Cooling

With reference to FIGS. 1 and 2, and as mentioned above, in some embodiments a fine level of temperature control in the isothermal bath may be achieved using heating and cooling elements 162, 164 located within the isothermal bath container 150, and also by mixing the isothermal fluid 158 with mixing elements 160. In some embodiments, a heating element 162 and a cooling element 164 may be located in each corner of the inner box bath cavity 154 of the isothermal bath container 150.

The cooling elements 164 may be coils in some embodiments. In some embodiments, the evaporation temperature of the refrigerant flowing through the cooling elements 164 may be set slightly below the desired temperature of the isothermal fluid 158. This may be accomplished by throttling the suction of a compressor used to pump the refrigerant through the cooling elements 164 in order to adjust the vacuum that is pulled on the evaporator. The refrigerant may be chilled by a chiller with a substantial cooling capacity due to the large thermal mass of the calorimeter 100, and may enable the cooling elements 164 to provide 4 kilowatts of cooling at −40° C. In some embodiments, the refrigerant may be injected in brief bursts into the cooling elements 164 for approximately a half of a second every twenty seconds. The refrigerant may be of any suitable type that will efficiently cool the isothermal fluid 158. In some embodiments, the refrigerant is R-404 refrigerant.

The heating elements 162 may also be coils in some embodiments, such as electrical resistance coils. In conjunction with the cooling elements 164 (which try to keep the temperature of the isothermal fluid 158 at just below the desired temperature), the heating elements 162 bring the temperature of the isothermal fluid 158 up to the desired temperature. In some embodiments, the heating elements 162 may be co-located with the cooling elements 164, for example the heating elements 162 may be positioned within the coils of the cooling element coils 164, which may help prevent hot and cool spots from developing within the bath.

In some embodiments, the calorimeters 100 use a number of proportional-integrative-derivative (PID) controllers in connection with the cooling elements 164 and the heating elements 162 to taper off the cooling as the isothermal fluid 158 approaches the target temperature and then to maintain the isothermal fluid 158 at the target temperature once it is reached. During operation of the calorimeters 100, the isothermal fluid 158 temperature may be maintained within ±0.001° C. of the target temperature in some embodiments.

With reference to FIG. 2, in some embodiments one or more mixing elements 160 may be used to cycle the isothermal fluid 158 around the test chamber 102 in the isothermal bath container 150. In some embodiments, each mixing element 160 may include a motor, a long thin shaft, and one or more impellers. In some embodiments, each mixing element 160 may include a circulating pump and piping. In some embodiments, four mixing elements 160 may be used, with two mixing elements 160 positioned at opposite corners of the isothermal bath container 150 and two mixing elements 160 angled across the long side of the test chamber 102. Such a configuration of mixing elements 160 allows the mixing elements 160 to work together to create a unidirectional flow of isothermal fluid 158 circling around the test chamber 102 and to cause the flow to snake around the test chamber 102 in an oscillating pattern. The mixing may in some embodiments be improved by using fluid dynamic models.

Cables Routed Through Bath

During operation of the calorimeters 100, it is necessary to connect a test sample 101 to an external power source so that the test sample 101 can operate. In various aspects, this is performed through the use of cables 170 running between the test sample 101 and the external power source. In some embodiments, the cables comprise metallic wires and insulating, protective layers. With reference to FIG. 1, in some embodiments one or more cables 170 may be routed from an external power source, through the isothermal fluid 158 and to the test chamber 102. The cables 170 routed through the isothermal fluid 158 may include the power cables that couple the test sample 101 to an external power supply (as described above), data cables that provide measurements from the heat flux sensors 110 to an external computer, and so forth. The cables 170 are routed through the isothermal fluid 158 in order to help reduce a heat backflow of ambient air temperature from influencing the heat flow measured by the heat flux sensors 110 and to keep any heat produced by the cables from interfering with the readings being made by the heat flux sensors 110. In some embodiments, some of the cables 170 (such as the power cables coupling a battery test sample 101 to an external battery cycler) may be routed with several turns through the isothermal fluid 158 in order to reduce conduction lead losses from the battery test sample 101 terminals 101a, 101b and thereby improve accuracy.

Liquid Cooling System

In some embodiments, the calorimeters 100 comprise a liquid cooled loop of piping or tubing to circulate a cooling fluid from outside the calorimeter 100 to a test sample 101 inside the test chamber 102. With reference to FIG. 4, in some embodiments, a battery test sample 101 may include an input port 101c to receive the cooling fluid within a test sample 101 and an output port 101d for discharging the cooling fluid from the test sample 101. In some embodiments, an external isothermal bath connected to a positive displacement pump provides the cooling fluid to the test sample 101, and may be able to inject the cooling fluid at precisely controlled temperatures and volumes. In certain embodiments, the cooling fluid is selected from water, a glycol (e.g., poly (propylene glycol), poly(ethylene glycol), and the like), transformer oil, silicon oil, other heat transfer fluids such as those comprising synthetic or organic based formulas, and combinations of the foregoing.

In order to measure the heat carried away by the cooling fluid, in some embodiments one or more heat flux sensors may be located at the cooling fluid input port 101c and output port 101d to provide a means to measure the heat exchanged. In some embodiments, the temperature of the fluid passing into and out of the calorimeter may be measured with resistance temperature detectors (RTDs; e.g., four-wire platinum RTDs that are accurate to 0.001° C.) and/or accurate thermocouples. The combination of precise volume and temperature measurements may allow for the determination of how much heat is being carried away by the liquid coolant.

In still other embodiments, the cooling liquid may pass through a heat exchanger before being introduced into the test chamber 102 in order to equilibrate the cooling fluid to the isothermal fluid 158 temperature. After the cooling fluid has cooled the test sample 101, the cooling fluid exits the test chamber 102 and passes through another heat exchanger that can measure the heat exchanged between the test sample and the cooling fluid. In some embodiments, the heat exchangers are placed in contact with the isothermal fluid 158. In some embodiments, the heat exchangers are located outside of the isothermal fluid container 150.

Operation

With reference to FIGS. 1 through 6, an operating protocol for certain embodiments of the calorimeters 100 disclosed herein will now be described. In various aspects, a test sample 101 such as a battery pack 101 is placed within the test chamber 102, the electrical connections are made via the positive terminal 101a and the negative terminal 101b of the test sample 101, and if desired, the liquid cooling lines are connected to the test sample 101 via the cooling fluid input port 101c and output port 101d. The lid 120 of the test chamber 102 is then secured with the securing mechanism 130, which in some embodiments comprise a plurality of spring-loaded clamps and which maintain a seal regardless of temperature changes in the isothermal fluid 158. The test chamber 102 is purged and may be slightly pressurized with an inert gas (e.g., nitrogen at 2 psi), and the pressurization may be maintained during testing in order to help prevent the isothermal fluid 158 from entering the test chamber 102 in the event of a thermal explosion or other event. The isothermal fluid 158 is then pumped into the inner box bath cavity 154 of the isothermal bath container 150 to a level that is approximately two inches above the lid 120 of the test chamber 102, thereby immersing all of the test chamber 102 except for the upper portion of the snorkel 125 under the isothermal fluid 158.

The lid 156 of the isothermal bath container 150 is positioned over the test chamber 102 and snorkel 125 and closed, and the isothermal fluid 158 is brought to the desired testing temperature. Thereafter, testing of the test sample 101 may commence.

Once the test sample 101 is secured inside the test chamber 102 of the calorimeter 100, a wide variety of tests may be performed. A programmable external power supply/load may be used to perform tests on the test sample 101, in some embodiments to simulate real-world use or in some embodiments to test the limits of the test sample's 101 specification. For example, a test sample battery pack 101 may be at least partially charged and at least partially discharged through one or more charge-discharge cycles by a commercial battery cycler. As the tests progress, any heat generated by the test sample 101 will flow through the heat flux sensors 110, be shunted to the outer box 103 and from there dissipated into the isothermal fluid 158. The precision of the measurements for the heat flux sensors 110 may be ±15 mW in some embodiments. Data collection may continue even after the tests are complete in order to allow the heat flow to return to baseline levels as the test sample equilibrates with the temperature of the isothermal fluid 158. The temperature of the isothermal fluid 158 may be varied across different tests, or even during a single test. For example, the test sample 101 may be tested with the isothermal fluid 158 at −40° C., and once those tests are complete, the temperature of the isothermal fluid 158 may be increased to −30° C. and additional tests may be performed. The temperature of the isothermal fluid 158 may similarly increase all the way up to +100° C., in a wide variety of increments. In some embodiments, the test sample 101 may be switched out in between each set of tests by at least partially draining the isothermal fluid 158 and opening the test chamber 102.

The data obtained from one or more tests of the test sample 101 may include an indication of the efficiency of the test sample as a function of temperature, and/or may be used among other things to design or improve a thermal management system for the test sample 101 or to design improvements to the test sample 101 itself. The data obtained from the tests may be particularly useful for batteries and battery packs used in electric vehicles, due to the relatively large effect temperature has on these batteries' efficiency.

A few of the many different tests that the calorimeter 100 can perform on a test sample 101 include, without limitation: directly measuring the self discharge of batteries and battery packs, determining power consumption from a battery management system (e.g., for lithium battery systems), measuring the heat generated by a battery and/or by an entire battery back as it is charged and/or discharged (including only charging or discharging, as opposed to only being able to do a combination of charging and discharging), measure heat generated in a single cell of a battery pack as the single cell and/or battery pack is charged and discharged (which may allow for identification of efficiency differences among several cells within a battery pack), measuring the heat generated by an electronic device as it is operated, measuring the changes (if any) of battery packs while stored for extended periods without being operated or measuring the performance of such battery packs after extended periods, and so forth.

In some embodiments, the type of data to be collected regarding a particular test sample 101 may determine the type or types of tests to be performed on the test sample 101 while in the calorimeter. For example, if it is known that cycling a battery test sample 101 in a particular manner generates heat in a particular area of the battery (e.g., the interconnects), the battery test sample 101 may be tested in that manner to determine thermal operating characteristics of that particular area of the battery. Also, an infrared or other type of temperature sensitive camera can be placed within the test chamber 102 in order to visualize the temperature variations of the test sample 101 during the tests. Because the calorimeter 100 may provide data regarding where heat is generated within a particular sample, this data may be used to help design an improved test sample 101 including design changes that may help prevent accidents (e.g., thermal explosions) from occurring. In general, the calorimeter 100 may be operated over a broad range of different tests for a particular test sample 101 placed within the test chamber 102.

Small Calorimeter

FIGS. 7 through 11 disclose embodiments of smaller volume, or cell, calorimter's provided by the present disclosure. With reference now to FIGS. 7 through 11, embodiments of a cell calorimeter 700 will now be described. The calorimeter 700 may be in some embodiments relatively small compared with the calorimeter 100 shown and described above in connection with FIGS. 1 through 6. The calorimeter 700 shown in FIGS. 7 through 11 and described hereafter may be of sufficient size to accommodate relatively small batteries or sub-packs of batteries, and other relatively small electronic devices. The calorimeter 700 may be used, among other things, for precise measurements of the heat generated by a test sample 701, and may generally be used to measure the thermal operating characteristics of batteries and other types of electronic devices. The shape and/or geometry of the test sample 701 can vary. In some embodiments, the test sample 701 can be cylindrical cells, cylindrical modules, prismatic cans, or prismatic pouch cells.

In various aspects, the calorimeters 700 shown in FIGS. 7 through 11 are similar to the calorimeters 100 shown in FIGS. 1 through 6 in that they contain similar structures and concepts relating to thermal flow and heat management.

Test Chamber

In some embodiments, the calorimeter 700 includes a test chamber 702 having an outer box 703. The calorimeters 700 also comprise one or more heat flux sensors 710 positioned on the bottom of the outer box 703 of the test chamber 702. Because the calorimeter 700 is relatively small, the test chamber 702 is only able to accommodate relatively small, light weight test samples 701. Therefore, the heat flux sensors 710 may be positioned on the bottom of the outer box 703 of the test chamber 702, as the heat flux sensors 710 will be able to better withstand the pressure caused by the relatively lighter weight of the test sample 701. This is in contrast to the large volume calorimeters 100 described above, wherein the heavy test samples 101 required that the heat flux sensors 110 be positioned on the sidewalls of the test chamber 104. In some embodiments, the outer box 703 serves as a thermal buffer to help prevent any changes in the temperature of isothermal fluid 758 from influencing the thermal measurements at the heat flux sensors 710.

In some embodiments, one or more thermally conductive plates 704a, 704b, 704c may be positioned on top of the heat flux sensors 710. The material from which the thermally conductive plates 704a, 704b, 704c are created can vary. In certain embodiments, the thermally conductive plates 704a, 704b, 704c are made of a thermally conductive material. In some embodiments, the thermally conductive material is selected from aluminum, iron, nickel, copper, zinc, tin, tungsten, lead, stainless steel, titanium, Hastalloy, Inconel, brass, and combinations thereof. In some embodiments, the thermally conductive plates 704a, 704b, 704c are created from structurally rigid and thermally conductive materials selected from aluminum, copper, stainless steel, steel, titanium, Hastalloy, Inconel and combinations thereof. In some embodiments, the thermally conductive plates 704a, 704b, 704c are aluminum. In some embodiments, one of the thermally conductive plates, 704a, may include holes to which a test sample 701 can be bolted or otherwise secured to the plate 704a. In some embodiments, the thickness of thermally conductive plate 704a can vary in that additional plates can be coupled to a base plate 704a to increase the thickness of the base plate 704a. In some embodiments, thermally conductive plate 704a may be painted black and/or anodized in order to increase its ability to absorb heat from the test chamber 102, including, in some embodiments, heat that is reflected off of the interior walls 722 as described below. The thermally conductive plates 704a, 704b, 704c serve to buffer the heat generated by the test sample 701 through to the heat flux sensors 710 at the bottom of the test chamber 702.

In various aspects, the test chamber 702 comprises a pair of interior walls 722. In some embodiments, the interior walls 722 are constructed to exhibit a low emissivity such that they reflect heat, rather than absorb it. In this manner, heat in the test chamber 702 may reflect off of the interior walls 722 and be directed toward the thermally conductive plate 704a, and from there through the heat flux sensors 710. The material from which the interior walls 722 are created can vary. In certain embodiments, the interior walls 722 are made of material that displays low emissivity. In some embodiments, the material is highly polished to enhance heat reflection. In some embodiments, the thermally conductive material is selected from aluminum, PVC, and combinations thereof. In some embodiments, the interior walls 722 are aluminum. Insulation 723 may be provided between the interior walls 722 and the outer box 703. The insulation 723 may be of any type that can prevent the transfer of heat. In some embodiments, the insulation 723 is selected from multi-layer insulation, vacuum insulation, fiberglass insulation, ceramic insulation, aerogel, SEAgel, ehalcogel, cadmium selenide insulation (e.g., quantum dots), and combinations thereof. In some embodiments, the insulation 723 is aerogel.

In some embodiments, the test chamber 702 comprises a lid 720. The material from which the lid 720 is created can vary. In certain embodiments, the lid 720 is made of a thermally conductive material. In some embodiments, the thermally conductive material is selected from aluminum, iron, nickel, copper, zinc, tin, tungsten, lead, stainless steel, titanium, Hastalloy, Inconel, brass, and combinations thereof. In some embodiments, the lid 720 is created from structurally rigid and thermally conductive materials selected from aluminum, copper, stainless steel, steel, titanium, Hastalloy, Inconel and combinations thereof. In some embodiments, the lid 720 is aluminum. In certain embodiments, the lid 720 comprises a snorkel 725 with a pipe and a burst disk 726, configured identically to the snorkel 125 and the burst disk 126 described above in connection with FIGS. 1 and 2. The lid 720 may be secured to the outer box 703 of the test chamber 702 by one or more sealing mechanisms 730. The sealing mechanism 730 may include o-rings, toggle clamps, plunger-type toggle clamps, spring loaded clamps, other sealing and fastening components, and combinations thereof. In some embodiments, the sealing mechanism 730 comprises clamps. The clamps may be spring loaded, and may maintain a seal between the lid 720 and the test chamber 702 regardless of the temperature of the isothermal bath—the springs provide a consistent sealing force even and thus compensate for differential thermal expansion and contraction of the seals and unit.

During operation of the calorimeter 700, in some embodiments the test chamber 702 may be immersed in isothermal fluid 758 in an isothermal bath container 750, much like the isothermal bath container 150 described above. In some embodiments, the isothermal fluid 758 is selected from Dynalene®, mineral oil, silicone oil, ethylene glycol/water, propylene glycol/water, Halocarbon, and combinations thereof. In some embodiments, the isothermal bath container 750 is filled with air rather than a fluid such that the air serves as the thermal buffer between the test chamber 702 and the external environment. In some embodiments, the isothermal bath container 750 is filled with a gas rather than a fluid such that the gas serves as the thermal buffer between the test chamber 702 and the external environment. In some embodiments, the gas comprises an inert gas that is unlikely to react with the components of the calorimeter 700. In some embodiments, the gas is selected from hydrogen gas, helium gas, nitrogen gas, oxygen gas, neon gas, argon gas, krypton gas, xenon gas and radon gas. In some embodiments, the gas is nitrogen gas.

In some embodiments, the isothermal bath container 750 comprises an inner bath cavity 754, surrounded by insulation 753 encased within an outer box 752. The insulation 753 may be of any type that can prevent the transfer of heat. In some embodiments, the insulation 753 is selected from multi-layer insulation, vacuum insulation, fiberglass insulation, ceramic insulation, aerogel, SEAgel, chalcogel, cadmium selenide insulation (e.g., quantum dots), and combinations thereof. In some embodiments, the insulation 753 is aerogel.

Figure 7:
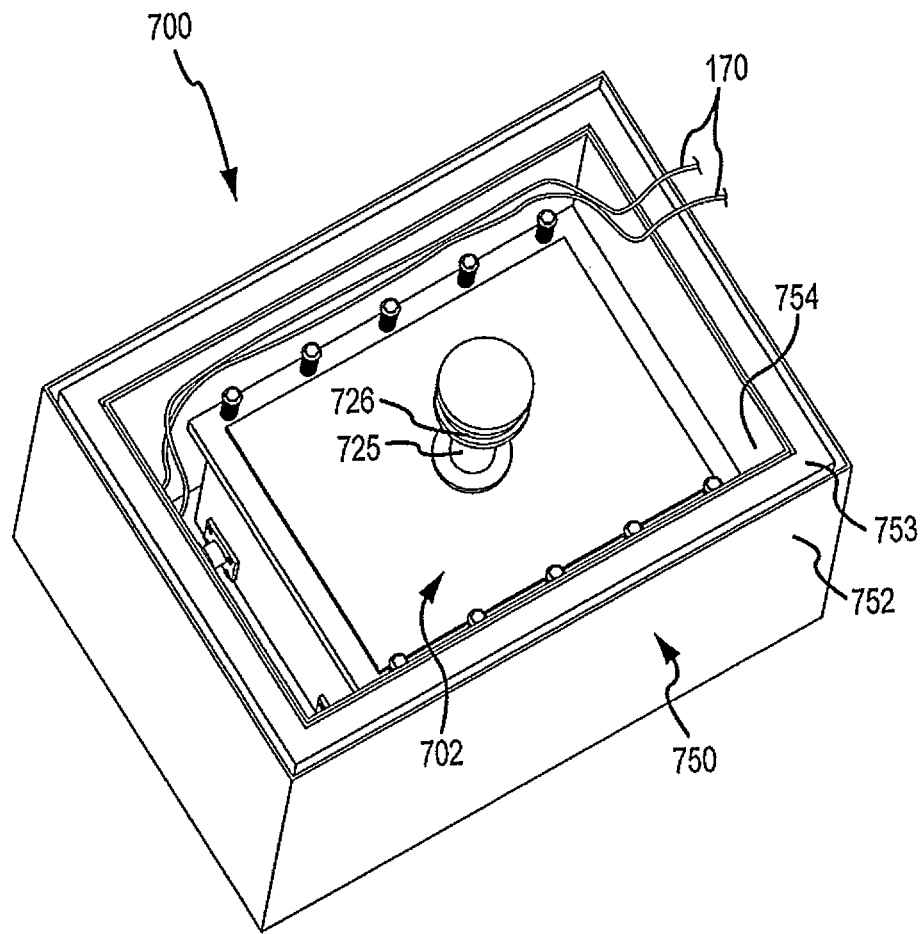
FIG. 7 shows a perspective view of a second embodiment of a calorimeter provided by the present disclosure.

With reference to FIG. 7, in some embodiments one or more cables 170 (including power and/or data cables) may be routed through the isothermal fluid 758, as described above. In some embodiments, one or more cables 170 (including power and/or data cables) may be routed to the inside of the test chamber 702 through the snorkel 725 tube. In some embodiments, one or more cables 170 (including power and/or data cables) may be routed to the inside of the test chamber 702 through the snorkel 725 tube after the cables 170 have been routed through the isothermal fluid 758 as described above. In some embodiments, one or more cables 170 (including power and/or data cables) may be routed to the inside of the test chamber 702 through the snorkel 725 tube without the need for the cables 170 to be routed through the isothermal fluid 758. In some embodiments, the isothermal bath container 750 may include heating and cooling elements and mixing elements, as described above, to help maintain the temperature of the isothermal fluid 758 at a relatively constant target temperature. In some embodiments, the isothermal bath container 750 comprises a lid 756 with a hood or vent 757 to accommodate the snorkel 725 and burst disc 726, that together cover the isothermal bath container 750. In some embodiments, the lid 756 comprises a cavity and at least one inlet and at least one out port that are configured to allow the isothermal fluid 758 to be circulated through the cavity via a pump to reduce the impact of environmental conditions.

As mentioned above, in some embodiments the heat flux sensors 710 are positioned on a single surface of the test chamber 702 which in certain embodiments is the bottom of the outer box 703. Positioning the heat flux sensors 710 on a single surface provides, among other things, the following advantages: dimensional tolerances may be easier to manage (the heat flux sensors 710 may remain flat and under pressure, thereby helping them to operate correctly; the even pressure maintained on the heat flux sensors 710 may allow a large operational temperature range and account for differential thermal expansion of the materials used in the fabrication of the calorimeter, electrical wiring of the heat flux sensors may be simplified, the number of heat flux sensors may be reduced, the cost of manufacturing the calorimeter 700 may be reduced, the thermal mass of the calorimeter 700 may be reduced thereby decreasing the time between tests and increasing testing throughput, the accuracy of the calorimeter may increase because fewer heat flux sensors are used, which may increase the measurement precision of the heat flux signal by reducing noise due to temperature variations in the isothermal fluid 758, and so forth.

Busbars

Figure 8:
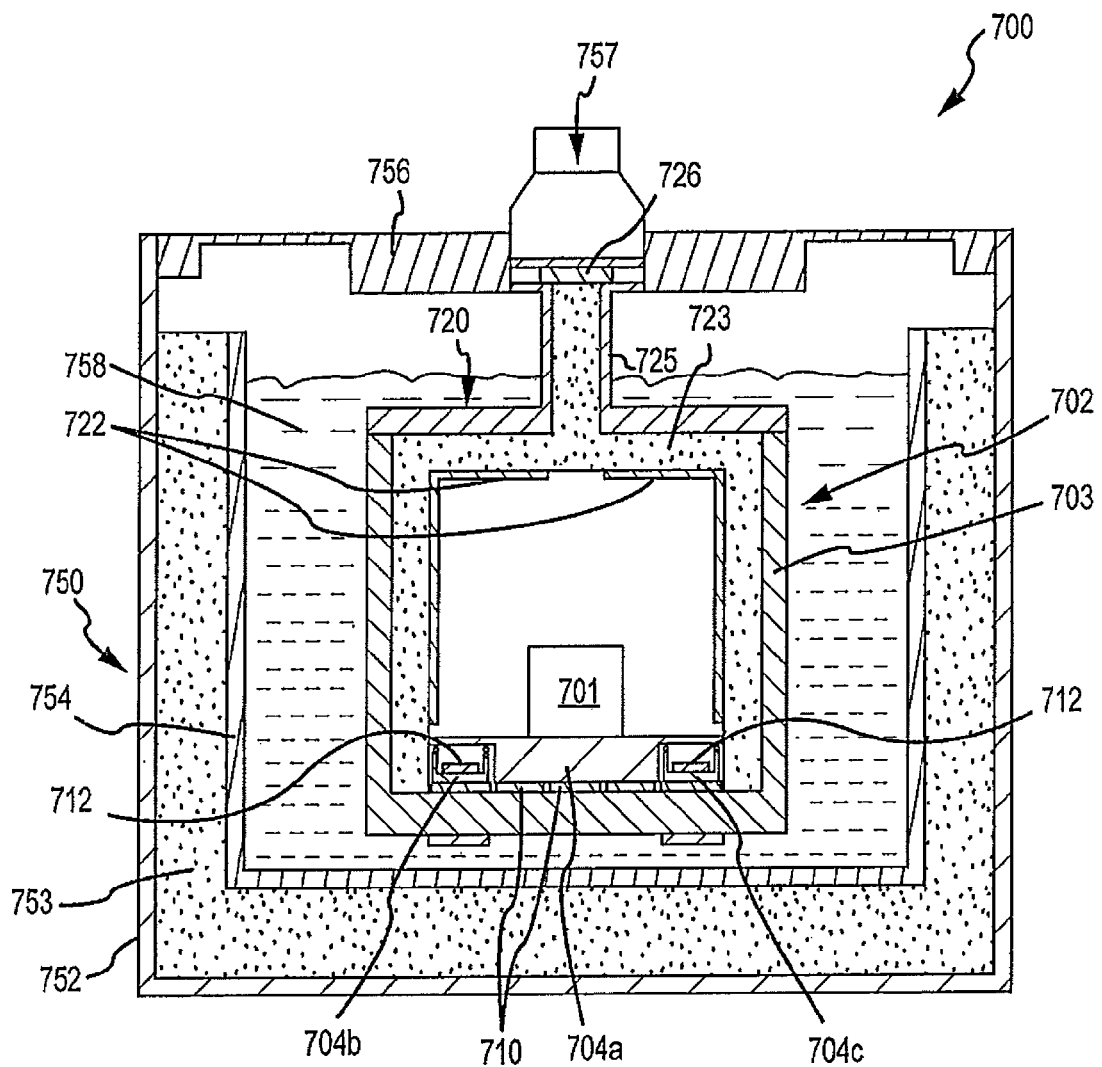
FIG. 8 shows a cross-section view of the calorimeter shown in FIG. 7.
Figure 9:
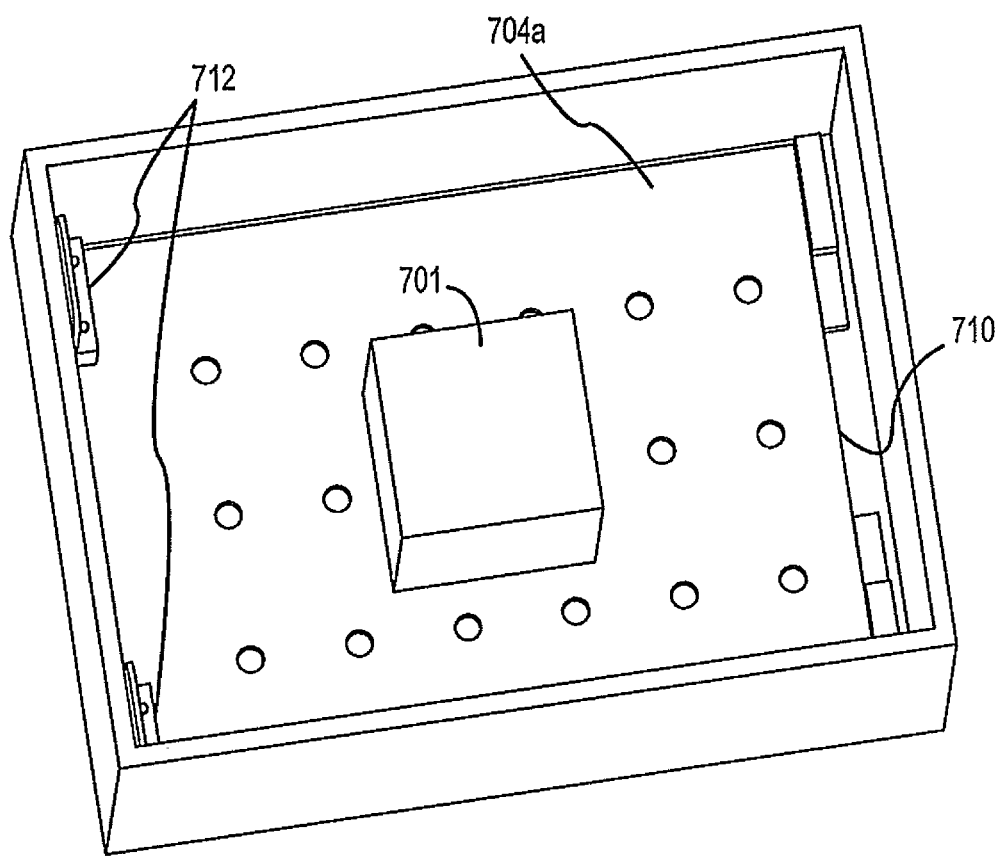
FIG. 9 shows a perspective view of an outer box of a test chamber for the calorimeter shown in FIG. 7.
Figure 10:
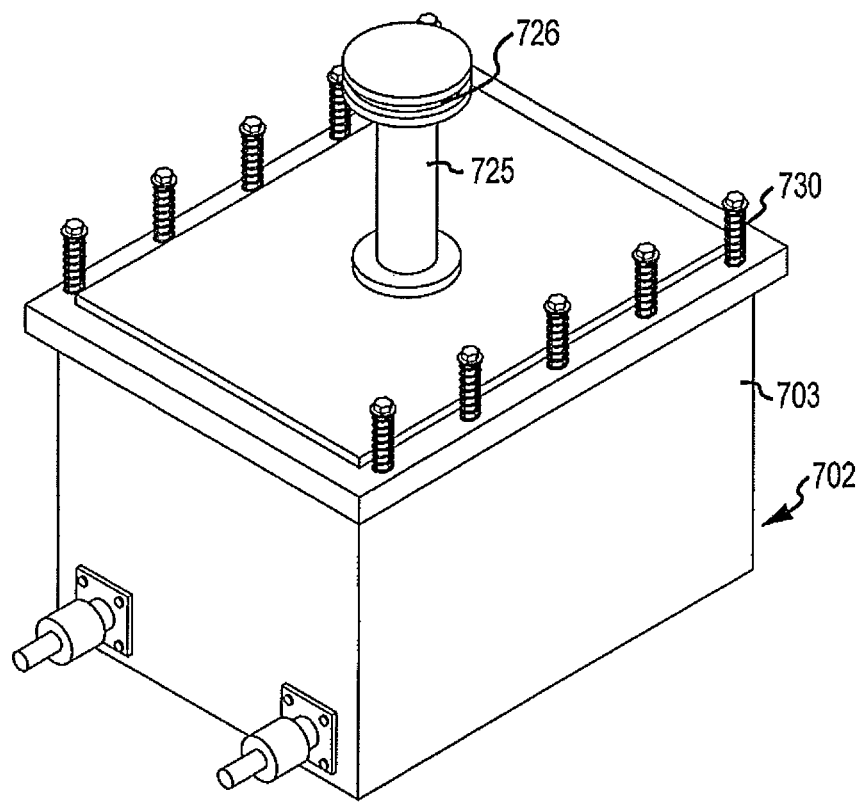
FIG. 10 shows a perspective view of the outer box and lid for a test chamber for use in the calorimeter shown in FIG. 7.
Figure 11:
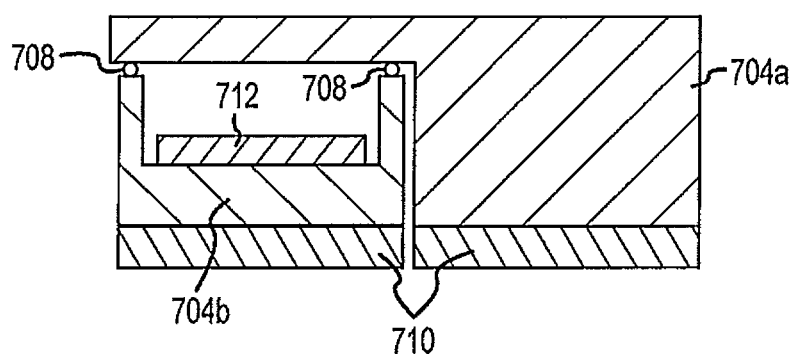
FIG. 11 shows an enlarged view of a portion of the cross-section view shown in FIG. 8.

With reference to FIGS. 8, 9, and 11, in some embodiments the calorimeter 700 comprises one or more busbars 712. Similar to the electrical conductors/busbars 112 described above, the busbars 712 depicted in FIGS. 8, 9, and 11 provide a coupling between the test sample 701 and an external power supply. Unlike the electrical conductors 112 disclosed above, however, the busbars 712 illustrated in FIGS. 8, 9, and 11 need not be thermally coupled to either the thermally conductive plate 704a or to the sidewalls 722 of the test chamber 702. Instead, in certain embodiments a busbar 712 may be coupled to a dedicated thermally conductive plate, either 704b, 704c or both.

In some embodiments, one busbar 712 is coupled to a thermally conductive plate 704b through a thermally conductive but electrically insulative pad such as, for example, a sil-pad.

In order to prevent and/or minimize heat flow between the thermally conductive plates 704a, 704b, 704c, in various aspects, the thermally conductive plates 704b and 704c may be thermally isolated from the thermally conductive plate 704a through one or more thermally insulative devices 708 (FIG. 11). In the embodiment depicted in FIG. 11, the thermally insulative devices 708 are balls. In various aspects, the thermally insulative devices 708 are configured as shown in FIG. 11, such that the point of contact between the thermally conductive plate 704a and each of the thermally conductive plates 704b and 704c is a ball, which allows only a small point of contact between the plates. The small point of contact will discourage heat from flowing from thermally conductive plate 704a to either of thermally conductive plates 704b or 704c, thereby forcing the heat to flow to the heat flux sensors 710.

The material from which the thermally insulative devices 708 are generated can vary. In some embodiments, the thermally insulative devices 708 are generated from a thermally insulating material selected from inorganic, non-metallic, crystalline oxide, nitride or carbide materials. In some embodiments, the thermally insulative devices 708 are ceramic.

In various aspects, the thermally conductive plates 704b, 704c measure heat generated in or from each respective busbar 712. Because this heat does not flow to the thermally conductive plate 704a, dedicated heat flux sensors 710 may be coupled to the thermally conductive plates 704b, 704c to separately measure the heat from the busbars 712 as opposed to the heat from the test sample 701 itself. Separately measuring the heat from the busbars 712 from the heat from the test sample 701 itself may allow for a more accurate measurement and/or may allow for the thermal operating characteristics of the test sample 701 to be specified in more detail. In some embodiments, however, the busbars 712 may be thermally coupled directly to the thermally conductive plate 704a, in which case the heat flux sensors 710 may measure the combined heat from the test sample 701 itself and the busbars 712. With reference to FIG. 9, in some embodiments the busbars 712 may be coupled underneath the thermally conductive plate 704a and one or more extensions of the busbars may extend upwards and be coupled to the top surface of the thermally conductive plate 704a through a thermally insulative device, so that the test sample 701 can be electrically coupled to the busbars 712.

Operation

In various aspects, operation of the calorimeter 700 is similar to operation of the calorimeter 100 described in detail above. In certain embodiments, operation of the calorimeter 700 is identical to operation of the calorimeter 100 described in detail above. In various aspects, operation of the calorimeter 700 is similar to operation of the calorimeter 100 described in detail above and includes a step of securing the test sample 701 to the thermally conductive plate 704a prior to testing.

Finally, it should be noted that there are alternative ways of implementing the embodiments disclosed herein. While a number of aspects and embodiments have been discussed above, those of skill in the art will recognize certain modifications, permutations, additions and sub combinations thereof.

Also, as noted above, the "large" and "small" calorimeters described herein are merely illustrative embodiments and many of the concepts of the large calorimeter embodiment, for example, may be applied to calorimeters of smaller size. For example, the heat flux sensors placed on the sides of the "large" calorimeter 100 may alternatively or additionally placed on the bottom of the "large" calorimeter, particularly if the test sample 101 is not particularly heavy or if a supporting structure is used to support most of the weight of the test sample 101. Similarly, heat flux sensors could be placed on the sidewalls of the "small" calorimeter 700. As another example of a modification, the lid 120, 720 of the calorimeters 100, 700 need not be immersed in water, but instead may have isothermal fluid 158, 758 pumped through the lid. Also, although reference has been made to specific materials (e.g., Dynalene, aerogel, aluminum, etc.), those of skill in the art will recognize that similar materials can be used instead of or in addition to those specifically listed above.

Accordingly, the present embodiments are to be considered as illustrative and not restrictive. Furthermore, the claims are not to be limited to the details given herein, and are entitled their full scope and equivalents thereof, including all such modifications, permutations, additions and sub-combinations as are within the claims' true spirit and scope.

What is claimed is:

1. A large volume calorimeter, comprising:
a test chamber comprising an inner box nested inside of an outer box and a plurality of heat flux sensors in contact with the exterior sidewalls of the inner box;
at least one thermally insulative device between the floor of the inner box and the floor of the outer box;
a thermally conductive device between each exterior sidewall of the inner box and each corresponding interior sidewall of the outer box, the at least one thermally conductive device comprising a first wedge and second wedge;
at least one busbar in contact with an interior wall of the inner box; and
a test chamber lid;
wherein the test chamber is configured to be fully submerged in an isothermal bath during operation of the calorimeter.

2. The calorimeter of claim 1, wherein the volume of the inner box is from about 4 liters to about 100 liters.

3. The calorimeter of claim 2, wherein the volume of the inner box is 96 liters.

4. The calorimeter of claim 1, wherein the isothermal bath comprises:
an isothermal bath container comprising a bath cavity that is larger than the test chamber, an isothermal fluid disposed in the cavity, and a lid.

5. The calorimeter of claim 4, wherein the volume of the bath cavity is from about 100 gallons to about 200 gallons.

6. The calorimeter of claim 5, wherein the volume of the bath cavity is about 160 gallons.

7. The calorimeter of claim 4, wherein the isothermal bath comprises at least one heating element and at least one cooling element configured to control the temperature of the isothermal fluid in the isothermal bath.

8. The calorimeter of claim 7, comprising at least one mixing element, comprising a motor, a long thin shaft, and at least one impeller.

9. The calorimeter of claim 1, wherein the at least one thermally insulative device provides thermal isolation of the floor of the inner box from the floor of the outer box.

10. The calorimeter of claim 9, wherein the at least one thermally insulative device comprises a column, comprising a sheath encircling an alternating arrangement of ceramic balls and cylinders.

11. The calorimeter of claim 1, wherein the at least one busbar comprises a cable connected to the busbar, wherein the cable comprises a first end disposed in the interior of the inner box and a second end disposed outside of the calorimeter.

12. The calorimeter of claim 11, wherein the cable is routed through the isothermal bath prior to connecting to the busbar.

13. The calorimeter of claim 1, wherein the lid comprises a snorkel, a burst disk and at least one sealing mechanism.

14. The calorimeter of claim 1, wherein the first and second wedges are triangular in cross section.

15. The calorimeter of claim 1, wherein the first wedge has a width tapered in a first direction, the second wedge has a width tapered in a second, opposite direction, the first wedge and second wedge oriented such that the thermally conductive device has a rectangular cross section.

16. The calorimeter of claim 1, wherein a thermally conductive element is provided at the interface between at least one of the first wedge and second wedge and the first wedge and the exterior sidewall of the inner box.

17. The calorimeter of claim 1, wherein the thermally coupling device is configured to apply uniform pressure on the plurality of heat flux sensors.

18. The calorimeter of claim 17, wherein the thermally coupling device is configured to apply uniform pressure on the exterior sidewall of the inner box.

19. A calorimeter, comprising:
a test chamber, comprising
an outer box comprising a plurality of heat flux sensors in contact with an interior floor of the outer box;

a first thermally conductive plate, a second thermally conductive plate and a third thermally conductive plate individually in contact with the top of some of the heat flux sensors wherein at least one thermally conductive plate is in contact with the interior floor of the outer box;

at least one busbar in contact with the interior floor of the outer box through a thermally conductive but electrically insulative pad; and a test chamber lid;

wherein the test chamber is configured to be fully submerged in an isothermal bath during operation of the calorimeter.

20. The calorimeter of claim 19, wherein the first thermally conductive plate is anodized and comprises a plurality of holes.

21. The calorimeter of claim 19, wherein the isothermal bath comprises:

a container, comprising an inner bath cavity that is larger than the test chamber, an isothermal fluid disposed in the cavity, an outer box, and a lid;

wherein the container is nested inside of the outer box.

22. The calorimeter of claim 21, comprising insulation between the container and the outer box.

23. The calorimeter of claim 19, wherein the second thermally conductive plate and the third thermally conductive plate are individually thermally isolated from the first thermally conductive plate through at least one thermally insulative device.

24. The calorimeter of claim 23, wherein the at least one thermally insulative device comprises a ceramic ball.

25. The calorimeter of claim 19, wherein the at least one busbar comprises a cable connected to the busbar, wherein the cable comprises a first end disposed in the interior of the test chamber and a second end disposed outside of the calorimeter.

26. The calorimeter of claim 25, wherein the cable is routed through the isothermal bath prior to connecting to the busbar.

27. The calorimeter of claim 19, wherein the test chamber lid comprises a snorkel, a burst disk and at least one sealing mechanism.

28. The calorimeter of claim 27, further comprising a cable routed through the snorkel and connected to the busbar.

* * * * *